United States Patent [19]

Gemeinhardt

[11] Patent Number: 4,867,233
[45] Date of Patent: Sep. 19, 1989

[54] HEAT EXCHANGER AND METHOD OF MAKING HEAT EXCHANGERS

[75] Inventor: Hermann Gemeinhardt, Obernburg, Fed. Rep. of Germany

[73] Assignee: Akzo N.V., Netherlands

[21] Appl. No.: 24,090

[22] Filed: Mar. 10, 1987

[30] Foreign Application Priority Data

Apr. 28, 1986 [DE] Fed. Rep. of Germany ....... 3614339

[51] Int. Cl.⁴ ............................................. F28F 9/04
[52] U.S. Cl. ................................ 165/173; 165/905
[58] Field of Search ............................... 165/173, 905

[56] References Cited

U.S. PATENT DOCUMENTS

| | | | |
|---|---|---|---|
| 2,433,546 | 12/1947 | Cornelius | 165/905 X |
| 2,538,808 | 1/1951 | Swiss | 156/83 |
| 2,966,373 | 12/1960 | Yount | 165/178 |
| 3,313,740 | 4/1967 | Withers | 165/173 |
| 3,315,740 | 4/1967 | Withers | 165/173 |
| 3,347,728 | 10/1967 | Preotle et al. | 165/173 |
| 3,419,069 | 12/1968 | Baker et al. | 165/173 |
| 3,435,893 | 4/1969 | Withers | 264/248 |
| 3,438,434 | 6/1969 | Smith | 165/178 |
| 3,459,622 | 8/1969 | Fischer | 156/423 |
| 3,529,664 | 9/1970 | Baker et al. | 165/178 |
| 3,592,261 | 7/1971 | Black | 165/178 |
| 3,610,418 | 10/1971 | Calderwood | 210/321 |
| 3,616,022 | 10/1971 | Withers | 156/296 |
| 3,708,069 | 1/1973 | Clark | 210/181 |
| 3,718,181 | 2/1973 | Reilly et al. | 165/180 |
| 3,741,849 | 6/1973 | Hardy | 165/173 |
| 3,820,661 | 6/1974 | Pages | 210/321 |
| 3,841,938 | 10/1974 | Grosse-Holling et al. | 165/178 |
| 3,993,126 | 11/1976 | Taylor | 165/79 |
| 4,044,443 | 8/1977 | Chartet | 29/157.4 |
| 4,047,563 | 9/1977 | Kurata | 165/158 |
| 4,098,852 | 7/1978 | Christen et al. | 261/104 |
| 4,177,816 | 12/1979 | Torgeson | 165/172 |
| 4,190,101 | 2/1980 | Hartman | 165/82 |
| 4,295,522 | 10/1981 | Frei | 165/79 |
| 4,300,971 | 11/1981 | McAlister | 165/178 |
| 4,481,057 | 11/1984 | Beard | 156/83 |

FOREIGN PATENT DOCUMENTS

| | | |
|---|---|---|
| 1238621 | 4/1967 | Fed. Rep. of Germany . |
| 2019763 | 11/1970 | Fed. Rep. of Germany . |
| 2119906 | 11/1971 | Fed. Rep. of Germany . |
| 2114782 | 9/1972 | Fed. Rep. of Germany . |
| 2221951 | 11/1973 | Fed. Rep. of Germany . |
| 2334086 | 1/1974 | Fed. Rep. of Germany . |
| 1704261 | 1/1976 | Fed. Rep. of Germany . |
| 2617208 | 7/1977 | Fed. Rep. of Germany . |
| 2603615 | 8/1977 | Fed. Rep. of Germany . |
| 2141019 | 2/1980 | Fed. Rep. of Germany . |
| 3240143 | 5/1984 | Fed. Rep. of Germany . |
| 3338157 | 5/1985 | Fed. Rep. of Germany . |
| 121029 | 7/1976 | German Democratic Rep. . |
| 264415 | 4/1966 | U.S.S.R. ............................ 165/173 |
| 1354502 | 5/1974 | United Kingdom ................ 165/905 |
| 1497204 | 1/1978 | United Kingdom . |

OTHER PUBLICATIONS

S. Charlier et al., "Warmetauscher aus PVDF for Aggressive Medien," CAV 1982, pp. 70-74.

Primary Examiner—Ira S. Lazarus
Assistant Examiner—Peggy Neils
Attorney, Agent, or Firm—Oliff & Berridge

[57] ABSTRACT

A heat exchanger comprises at least one group of tubes of thermoplastic synthetic material, the tube ends of a group being packed closely together and the tube ends of adjacent tubes being fused to one another on their end face. Preferably, the tube ends are arranged in a sleeve enclosing the group of tubes, the external tube ends being fused with the sleeve. The heat exchangers are made in such a way that the tube ends are assembled together and inserted into a sleeve. The tubes are placed in vertical position, with their ends essentially upward. Heat is then supplied to the tube ends from above, causing the tube ends to expand and occasionally to fuse with the sleeve.

10 Claims, 3 Drawing Sheets

HEAT EXCHANGER AND METHOD OF MAKING HEAT EXCHANGERS

FIELD OF THE INVENTION

The invention concerns a heat exchanger comprising at least one group of tubes of thermoplastic synthetic material as well as a method of making such heat exchangers.

BACKGROUND OF THE INVENTION

Heat exchangers of known construction consist of tubes or groups of tubes which are embedded into a tube sheet. This tube sheet is made either separately, in which case the tube ends must subsequently be fixed in the tube sheet, or the tube sheet is made during the manufacture of the heat exchanger by injecting a sealing compound between the tube ends. The production of such heat exchangers is expensive, since either the tubes must be inserted into the tube sheet and positioned prior to fastening to the tube sheet, or special devices must be used to maintain the proper distance between the tube ends while the sealing compound (self-curing material or plastic melt) is injected between the tubes.

SUMMARY OF THE INVENTION

The present invention has an object the provision of a heat exchanger that can be made by a very simple method. Moreover, the heat exchanger according to the invention has a very compact design in the area corresponding to the conventional tube sheet. Another object of the invention is to provide a method of making these heat exchangers that can be carried out very simply.

This object is achieved, in this type of heat exchanger, in that the tube ends of a group lie close together side by side and the ends of adjacent tubes are fused to one another on their end face. Such a heat exchanger is not provided with a conventional tube sheet.

Preferably, the tube ends of a group are enclosed in a sleeve made at least partially of thermoplastic material and the ends of the tubes adjacent to the sleeve are fused thereto on their end face.

The combination of sleeves and tube ends affords a compact arrangement of the tube ends without sacrificing the strength and tightness required at the inlet of a heat exchanger.

BRIEF DESCRIPTION OF THE DRAWINGS

The invention will be further explained by reference to the accompanying drawings, in which.

DETAILED DESCRIPTION OF PREFERRED EMBODIMENTS OF THE INVENTION

Figure 1:
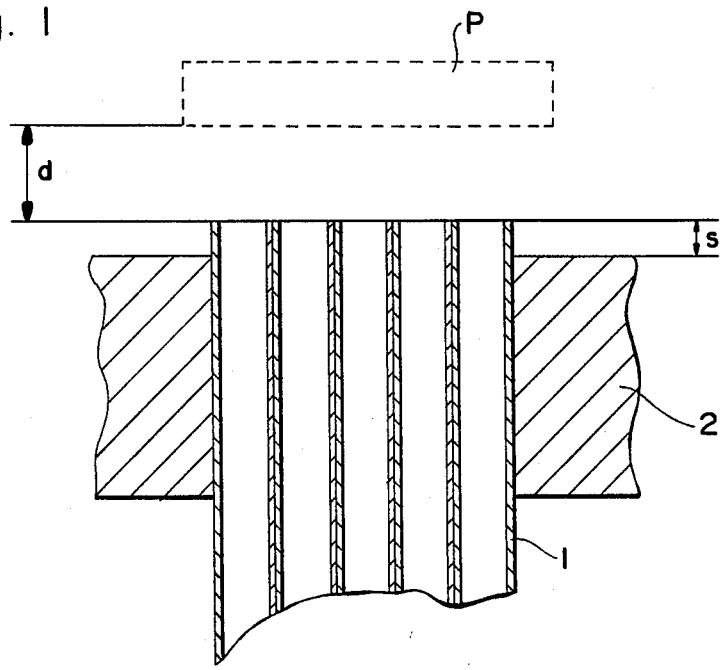
FIG. 1 is a cross-sectional view of an arrangement of tube ends already positioned in a sleeve prior to thermal treatment.
Figure 2:
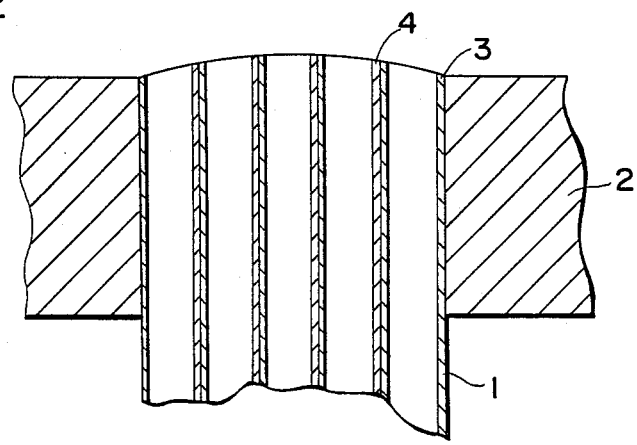
FIG. 2 shows the arrangement of FIG. 1 subsequent to thermal treatment.

Preferably, the tube ends are made of a thermoplastic synthetic material which in the range between ambient temperature and melting temperature, has a mean linear expansion coefficient between $100 \times 10^{-6}$ and $400 \times 10^{-6}$ 1/K.

As a rule, the tube ends are fused to one another or to the sleeve at least to a depth corresponding to the smallest wall thickness of the tubes.

The term "heat exchanger" as used herein also covers substance exchangers for gases as well as sound absorbers for gas or liquid jets.

The term "tubes" are used herein includes all tubular bodies such as tubes, hoses, and hollow-filament yarns. The cross-sectional shape of the tubes is not limited to circular cross sections; the tubes may also have cross sections that are elliptical or polygonal, e.g., triangular, quadrangular, square, pentagonal, etc. The wall thickness of the tubes, defined by the external and internal cross sections of the tubes, can be the same or different along the circumference of the tubes. External and internal cross sections of the tubes can have the same or a different cross-sectional form. For instance, a tube can have a polygonal contour in its external cross section and a circular or elliptical contour in its internal cross section.

In addition, the internal cross section of the tubes may have one or several continuous cavities. The tubes may also be combined into groups. These groups of tubes may have the external shape of a plate, e.g., if the tubes are arranged side by side axially parallel and the axes lie in a straight line.

A particularly compact shape in the area of the sleeve of the heat exchanger according to this invention is achieved if the internal cross section of the sleeve and the external cross section of all the ends of the group of tubes disposed within a sleeve have the form of a hexagon. This is especially true if the external cross section of each tube or of each group of tube is circular or hexagonal. For circular cross sections of the tube ends, the hexagon ensures the densest packing of the tube ends. Such a hexagon, as a rule, has at least substantially equal length sides. However, any cross-sectional shape of the sleeve is suitable if the tube ends can be inserted into the W sleeve in a compact arrangement.

Each group of tubes may consist of 7 to 1141 tubes.

Preferably, the thermoplastic polymer material of which the tubes and/or the sleeve is made is a polyethylene, polypropylene, or one of the fluorine polymers. Typically, the tubes of the heat exchanger exhibit no porosity, or a porosity of no more than 20% of the wall volume.

The object of this invention is also achieved by a method of making a heat exchanger embodying this invention, which is distinguished by the fact that the tube ends (of at least one end of the tubes) are assembed together and are laced in a sleeve in such a way that the tube ends are arranged nearly vertically upward, and the tube ends form with one another an essentially flat surface. Thereafter heat is supplied to the tube ends from above until at least some of the tube ends soften and the outer walls of the tube ends expand in such a way that they abut against the outer walls of adjacent tube ends and fuse therewith. As a rule, the heat is supplied by heat radiation. In case of heat radiation, the simplest way of supplying heat is by moving a heating plate toward the tube ends from above and positioning it at a slight distance, somewhere between 0.5 and 30 mm, until the tube ends have fused with one another. The thermal treatment may also be carried out in a vacuum or under a protective gas atmosphere, in which case the distance of the heating plate may be in different ranges.

However, heat may also be supplied by sound waves, light, electromagnetic waves, hot gases, hot liquids, etc. It is highly preferable that the tube ends do not come into contact with the actual heat source.

If, in the process incorporating the invention, a sleeve is used that is made of a material to which the tube ends adhere very little or not at all, the sleeve can be removed after the fused tube ends have cooled. The fused tube ends can then be embedded in a different sleeve, for instance, in a tube sheet or in a heat exchanger, by conventional methods.

Advantageously, the tube ends are positioned in such a way that they are flush with the sleeve or rise up to about 4 mm thereabove.

The surface of the fused tube ends will have a superior strength if a sleeve is used at least partially comprising thermoplastic material, and sufficient heat is supplied to the tube ends until the tubes adjacent to the sleeve abut thereagainst and fuse therewith.

Preferably, the thermal treatment should be carried out in compliance with the following conditions:

$$0.0175 < Q\, e \left( \frac{t}{\zeta\, C_p\, \lambda} \right)^{\frac{1}{2}} < 0.5,$$

in which:

Q is the amount of heat supplied, in $J/m^2\,s$, per surface (end face) and time.

e is the linear expansion coefficient of the rod material in $1/K$., t is the time duration of the thermal effect in sec., $\zeta$ is the density of the rod material in $kg/m^3$, $C_p$ is the specific heat of the rod material in $J/kg\,K$., and $\lambda$ is the thermal conductivity of the rod material in $J/msK$.

The method of the invention is of particular advantage if the tubes are made of a thermoplastic material which, in the range between ambient temperature and melting temperature, possesses a mean linear expansion coefficient between $100 \times 10^{-6}$ and $400 \times 10^{-6}\,1/K$.

Advantageously, at least some of the tube ends are heated to a temperature that is above the melting temperature of the tube material.

On their end face, i.e., on the surface in which the tubes end, the heat exchangers made by the method according to the invention have a surface that is flush with the sleeve if—prior to thermal treatment—the tube ends are placed in the sleeve opening in such a way that they rise 0.5 to 3 mm above the sleeve.

The process incorporating the invention produces the most favorable results if, prior to supplying heat, the tube ends are combined into a compact packing, in the case of the tube ends with circular or hexagonal external cross sections, with hexagonal external contour.

With the process embodying the invention, it is preferable to use tubes whose hydraulic diameter of each cavity is between 0.3 and 15 mm, preferably between 0.5 and 7.5 mm, and whose wall thickness at the thinnest point is between 5 and 25%—preferably between 7.5 and 17.5%—of the hydraulic diameter.

The term "sleeve" as used herein is not limited to tubular bodies. It may also have the shape of a plate with a continuous opening that correlates with the external contour of the tube bundle. A plate may also have several openings for each tube bundle. However, the sleeve may also be a part of the heat exchanger shell enclosing the bundle of tubes.

Where in the description of the method incorporating the invention it is recited that, prior to the thermal treatment, the tube ends are so positioned that they form a substantially flat surface, this condition shall include the possibility that this surface has a convex or concave shape.

The invention will now be described in detail by reference to one practical embodiment.

The properties of the plastic materials used in the ensuing embodiment are listed in the table below:

TABLE

| Property | Determination according to | Unit | PVDF type I | PVDF type II |
|---|---|---|---|---|
| density | ASTM D 792 | $g/cm^3$ | 1.78 | 1.78 |
| melt flow index | ASTM D 1238 | | | |
| —230° C. 10 kg | | g/10 min | 50 | 13 |
| —230° C., 5 kg | | g/10 min | 18 | 4 |
| —230° C., 2.16 kg | | g/10 min | 6 | 1 |
| crystalline melting point | | °C. | 177 | 177 |
| linear expansion coefficient | ASTM D 696 | $K^{-1}$ | $106 \times 10^{-6}$ | $128 \times .10^{-6}$ |
| heat conductivity | ASTM C 177 | W/m.K | 0.19 | 0.19 |
| specific heat between 0 and 100° C. | | J/kg.K | 960 | 960 |
| tensile strength 5 mm/min | ASTM D 638 | MPa | 57 | 54 |
| elongation 5 mm/min | ASTM D 638 | % | 12 | 80 |
| modulus at 1 mm/min | ASTM D 638 | MPa | 2600 | 2400 |

91 tubes of PVDF Type I, having an outside diameter of 2 mm and a wall thickness of 0.15 mm, are combined into a bundle such that they can be inserted into a hexagonal opening of a sleeve made of PVDF Type II with a length of 30 mm. All sides of the hexagonal opening are 12 mm long with all the corners of the hexagon located on a circle. The opening of the plate is beveled toward the outside surface (end face), with opposing bevels enclosing an acute angle of 45°, and with the bevel extending from the surface to a depth of 1.5 mm. The tube ends are so positioned in the opening of the sleeve that the tube ends rise 0.5 mm above the edge of the sleeve.

A round heating plate with a diameter of 100 mm and having an emission coefficient of 0.9 was heated to a temperature of 430° C., then held for 2 minutes at a distance of 10 mm above the essentially upwardly pointing tube ends, causing the tube ends to expand. After the tube ends and the sleeve have cooled down, it can be determined that the tube ends have become fusion-welded to one another or to the sleeve to a depth of 1.25 mm.

The opposing tube ends are fused together in the same manner. One group of tubes so made or several such groups placed side by side can be inserted into the shell of a heat exchanger.

In FIG. 1, the five tubes (1) shown are positioned in a sleeve (2)—here, in the shape of a plate—in such a way that the tube ends form a flat surface and rise by an amount (s) above the sleeve (2). For the thermal treatment, a heated plate (P) shown in dashed lines is held above the tube ends at a distance (d). This causes the tube ends to expand and to fuse together.

Subsequent to the thermal treatment, the ends of tubes (1) are joined to one another and/or to sleeve (2). The points where the end of one tube (1) has become fused with sleeve (2) are denoted (3), and the points where two tube ends have become fused are denoted (4).

In cross section, one can see at fusion points (3) and (4) that the materials of the two fused ends have blended in such a way that the outer surface of the tube is no longer recognizable.

Figure 3:
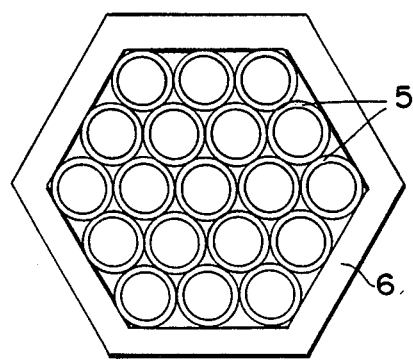
FIG. 3 is a top plan view according to FIG. 1 of an arrangement of tube ends already positioned in a sleeve, prior to thermal treatment.

FIG. 3—similar to FIG. 1—shows in top plan view an arrangement of 19 tubes in a sleeve (6) of hexagonal cross section, prior to thermal treatment. This arrangement results in the densest packing for tubes of circular cross section.

Figure 4:
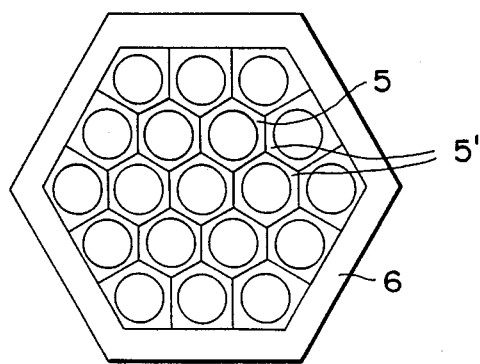
FIG. 4 shows the arrangement in accordance with FIG. 3, subsequent to thermal treatment.

After thermal treatment—when the tube ends of the tubes (5) have become fused together—the top plan view produces an arrangement having a uniform face seal as shown in FIG. 4. If a tube (5) has become fused with six adjacent tubes (5'), the top plan view of the tube (5) (onto the end face) shows a hexagonal contour of the tube end. For tube ends that have become fused with the sleeve (6) as well, the resulting contours are also shown in FIG. 4.

What is claimed is:

1. A heat exchanger comprising at least one group of tubes of thermoplastic synthetic material, wherein tube ends of said group of tubes are packed closely together and the ends of adjacent tubes are fused to one another at their end faces, said heat exchanger being produced by a process comprising placing said tube ends of said group of tubes in a sleeve such that the tube ends are in a substantially upward vertical position, are closely packed together, and form a substantially flat surface; from a position above said tube ends, applying sufficient radiant heat to said tube ends to cause them to soften and their outer walls to expand against and fuse with the outer walls of adjacent tube ends, to form a uniform face seal at said fused end faces.

2. The heat exchanger as set forth in claim 1, wherein the tube ends of said group are enclosed in a sleeve comprised of thermoplastic material and the tube ends adjacent to the sleeve are fused thereto at their end faces.

3. The heat exchanger as set forth in claim 1, wherein the tube ends are comprised of thermoplastic synthetic material which, in the range between ambient temperature and melting temperature, has a mean linear expansion coefficient between $100 \times 10^{-6}$ and $400 \times 10^{-6}$ 1/K.

4. The heat exchanger set forth in claim 2, wherein the tube ends are fused to one another or to the sleeve at least to a depth corresponding to the smallest wall thickness of the tubes.

5. The heat exchanger as set forth in claim 2, wherein an internal cross section of the sleeve and an external cross section of all the ends of the groups of tubes disposed within the sleeve have the form of a hexagon.

6. The heat exchanger as set forth in claim 1, wherein each said group of tubes comprises 7 to 1141 tubes.

7. The heat exchanger as set forth in claim 2, wherein at least one member selected from the group consisting of said tubes and said sleeve is comprised of a thermoplastic fluorine polymer.

8. The heat exchanger as set forth in claim 2, wherein at least one member selected from the group consisting of said tubes and said sleeve is comprised of polyethylene.

9. The heat exchanger as set forth in claim 2, wherein at least one member selected from the group consisting of said tubes and said sleeve is comprised of polypropylene.

10. The heat exchanger as set forth in claim 1, wherein the tubes have a porosity of no more than 20% of their wall volume.

* * * * *

UNITED STATES PATENT AND TRADEMARK OFFICE
CERTIFICATE OF CORRECTION

PATENT NO. : 4,867,233
DATED : September 19, 1989
INVENTOR(S) : Hermann GEMEINHARDT It is certified that error appears in the above-identified patent and that said Letters Patent is hereby corrected as shown below:

IN THE SPECIFICATION:

Col. 1, line 27, after "has" insert --as--.

Col. 2, line 36, change "tube" (second occurrence) to --tubes--;

line 42, delete "W";

line 45, change "is" to --are--.

Signed and Sealed this

Second Day of October, 1990

Attest:

HARRY F. MANBECK, JR.

*Attesting Officer*　　　*Commissioner of Patents and Trademarks*